United States Patent [19]
Shahani et al.

[11] Patent Number: 5,628,976
[45] Date of Patent: May 13, 1997

[54] COFIRING BIOSOLIDS IN A SPENT SULFURIC ACID REGENERATION FACILITY

[75] Inventors: Goutam H. Shahani, Allentown; Harold H. Gunardson, Kempton; John M. Fernbacher, Allentown, all of Pa.

[73] Assignee: Air Products and Chemicals, Allentown, Pa.

[21] Appl. No.: 544,046

[22] Filed: Oct. 17, 1995

[51] Int. Cl.⁶ .......................... C01B 17/90; C01B 17/50
[52] U.S. Cl. .................. 423/531; 423/541.1; 423/540
[58] Field of Search .......................... 423/522, 533, 423/531, 541.1, 540

[56] References Cited

U.S. PATENT DOCUMENTS 4,256,721  3/1981  Blakey et al. ........................ 423/540
4,376,107  3/1983  Morgenthaler ....................... 423/531
4,490,347  12/1984  Gelblum ............................ 423/531
5,022,332  6/1991  Ding ................................ 423/522
5,266,297  11/1993  Kodama ............................. 423/548
5,405,537  4/1995  Goff et al. ........................ 210/739

FOREIGN PATENT DOCUMENTS 2090594  9/1993  Canada .
0091679  1/1986  European Pat. Off. .
1092171  11/1967  United Kingdom .
1288851  9/1972  United Kingdom .
1602621  11/1981  United Kingdom .
93/13362  7/1993  WIPO .

*Primary Examiner*—Gary P. Straub
*Attorney, Agent, or Firm*—Thomas G. Ryder

[57] ABSTRACT

A process for increasing throughput in a spent sulfuric acid dissociation furnace by injecting dewatered biosolids preconditioned to enhance combustion into the furnace while enriching the oxygen content of the air used in the process.

9 Claims, 2 Drawing Sheets

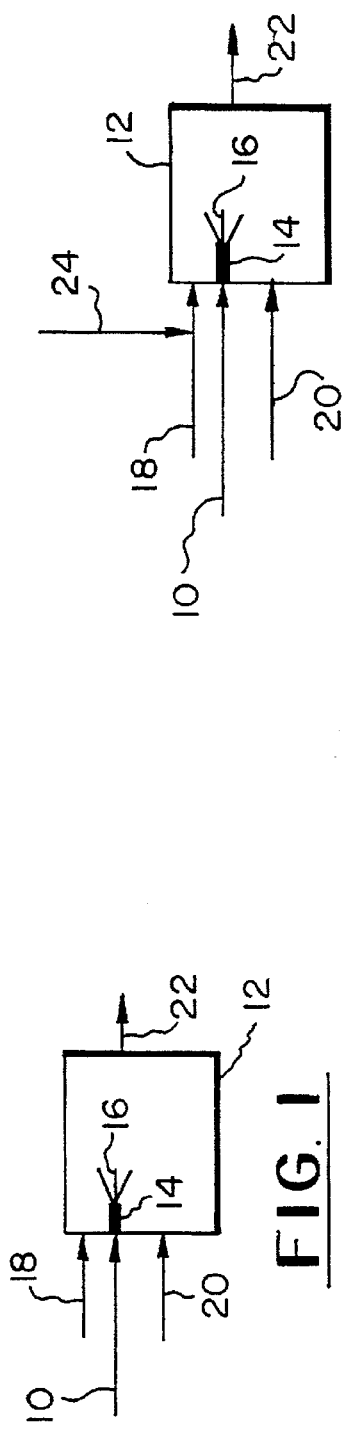
FIG. 2
FIG. 1 (PRIOR ART)
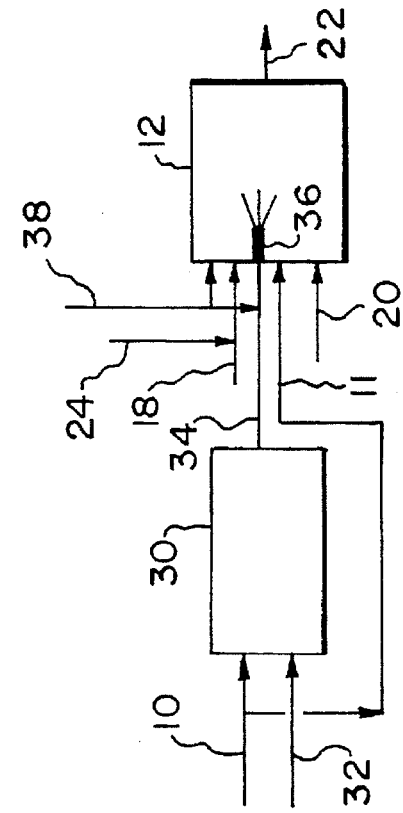
FIG. 4
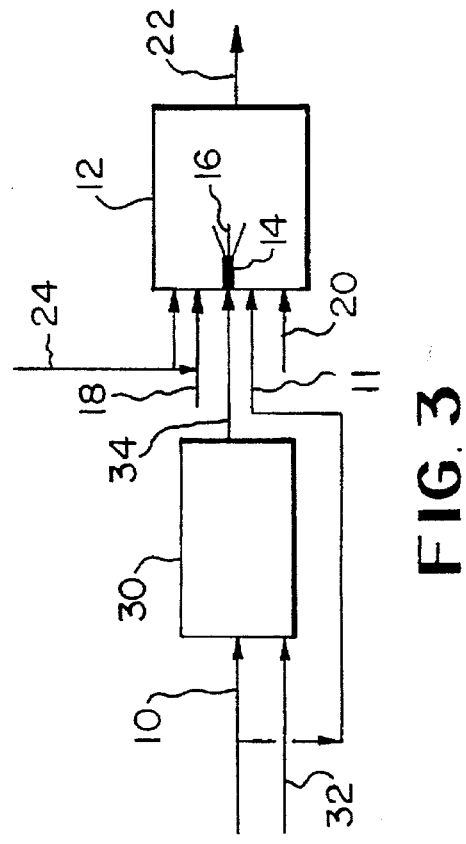
FIG. 3

COFIRING BIOSOLIDS IN A SPENT SULFURIC ACID REGENERATION FACILITY

FIELD OF THE INVENTION

The present invention pertains to the dissociation step in a spent sulfuric acid regeneration process.

BACKGROUND OF THE INVENTION

Spent (contaminated) sulfuric acid is generated in various chemical production processes such as gasoline alkylation, titanium dioxide production, methyl methacrylate production, and various nitration processes to name but a few. Spent sulfuric acid from these processes has been disposed of by either deep well injection, or neutralization and discharge of the spent sulfuric acid into water ways, oceans or landfills. An accepted alternative to disposal has been the regeneration of spent sulfuric acid by first dissociating the sulfuric acid to obtain sulphur dioxide and other products. The sulfur dioxide is then oxidized to sulfur trioxide and the sulfur trioxide hydrated to form reusable sulfuric acid. The dissociation reaction is endothermic and normally carried out in a furnace. In other words, sulfuric acid dissociation requires the addition of heat since it has no intrinsic heating value. The energy for dissociation is provided by the combustion of residual hydrocarbons in the spent acid with air and supplemental fuels which can be either natural gas or fuel oil to sustain combustion. Combustion temperatures are between 1800° and 2000° F. resulting in flue gases containing 10% to 15% sulfur Dioxide along with oxygen, nitrogen, carbon dioxide and steam.

Regeneration of spent sulfuric acid is two to three times as expensive as acid made directly from sulfur. The disposal of spent sulfuric acid is an ever increasing problem because of environmental regulations which are becoming more and more stringent. At the same time, demand for alkylates in unleaded gasoline is increasing thus, creating more spent sulfuric acid.

In an attempt to regenerate increasing amounts of spent sulfuric acid, oxygen enrichment of combustion air has been used to increase the capacity of a given regeneration facility. Use of oxygen enriched air permits more acid to be processed in an existing facility thereby improving the process economics to a certain degree. The combustion that is normally carried out with air, which contains 21% oxygen with the remainder being nitrogen, puts nitrogen into the process which plays no useful role in the waste combustion but leads to heat losses in the stack and reacts with oxygen to produce nitrogen oxides (known as thermal $NO_x$), which in turn leads to smog formation, ozone depletion in the atmosphere and acid rain.

The formation of thermal $NO_x$ is extremely temperature sensitive. By enriching the combustion air to approximately 28% oxygen, the number of oxygen molecules available for combustion can be increased by 25% without increasing the volume of combustion air or flue gas. Hence, the waste processing capacity of a furnace can be increased. However, this approach has not been widely adopted in the market place because; oxygen enrichment leads to an increase in the furnace flame temperature including localized hot spots which have a detrimental effect on the materials of construction of the combustor and oxygen constitutes an additional cost of production that the regeneration facility has to incur. The extra cost for the oxygen is partially offset by the increased amount of acid processed in a given facility.

U.K. Patent 1,288,851 discloses and claims a process for regenerating sulfuric acid from spent acid, which patentee refers to as sludge, utilizing oxygen additions to air atomize spent sulfuric acid in a treatment furnace.

Other processes for treating spent sulfuric acid are disclosed in a published PCT application W093/13362 U.K. Patents 1,602,621 and 1,092,171; Canadian Patent Application 2,090,594; European Patent 0 091 679 and U.S. Pat. Nos. 4,256,721, 4,376,107; 5,022,332 and 5,266,297.

Another problem facing industry is the disposal of dewatered biosolids. Attempts at disposal of dewatered biosolids include the injection of dewatered biosolids into a municipal solid waste incineration system such as shown and described in U.S. Pat. No. 5,405,537. The process of the '537 patent uses the municipal solid waste as a heat source with the biosolids injected into the furnace for incineration.

SUMMARY OF THE INVENTION

Increased throughput of spent sulfuric acid for a given size dissociation furnace, used in a process for recovering spent sulfuric acid, can be effected by injecting preconditioned biosolids into the furnace while enriching the oxygen content of the air used in the conventional air fuel burner. Preconditioning of the biosolids can be achieved by (a) premixing dewatered biosolids with spent sulfuric acid and injecting the mixture of spent sulfuric acid and biosolids into the dissociation furnace, or (b) directly injecting dewatered biosolids into the dissociation furnace through a dual fluid atomizer utilizing oxygen, methane, nitrogen, steam or other gases as the conditioning fluid, or (c) thermally conditioning the dewatered biosolids. Utilizing the process of the present invention permits disposal of dewatered sludge while recovering fuel value from the dewatered sludge and enhancing throughput of a given size spent sulfuric acid dissociation furnace.

BRIEF DESCRIPTION OF THE DRAWING

FIG. 1 is a schematic diagram of the dissociation step in a spent sulfuric acid recovery process.

FIG. 2 is a schematic representation of oxygen enrichment of the dissociation step of FIG. 1.

FIG. 3 is a schematic representation of an embodiment of the process according to the present invention.

FIG. 4 is a schematic representation of another embodiment of the process according to the present invention.

DETAILED DESCRIPTION OF THE INVENTION

Figure 5:
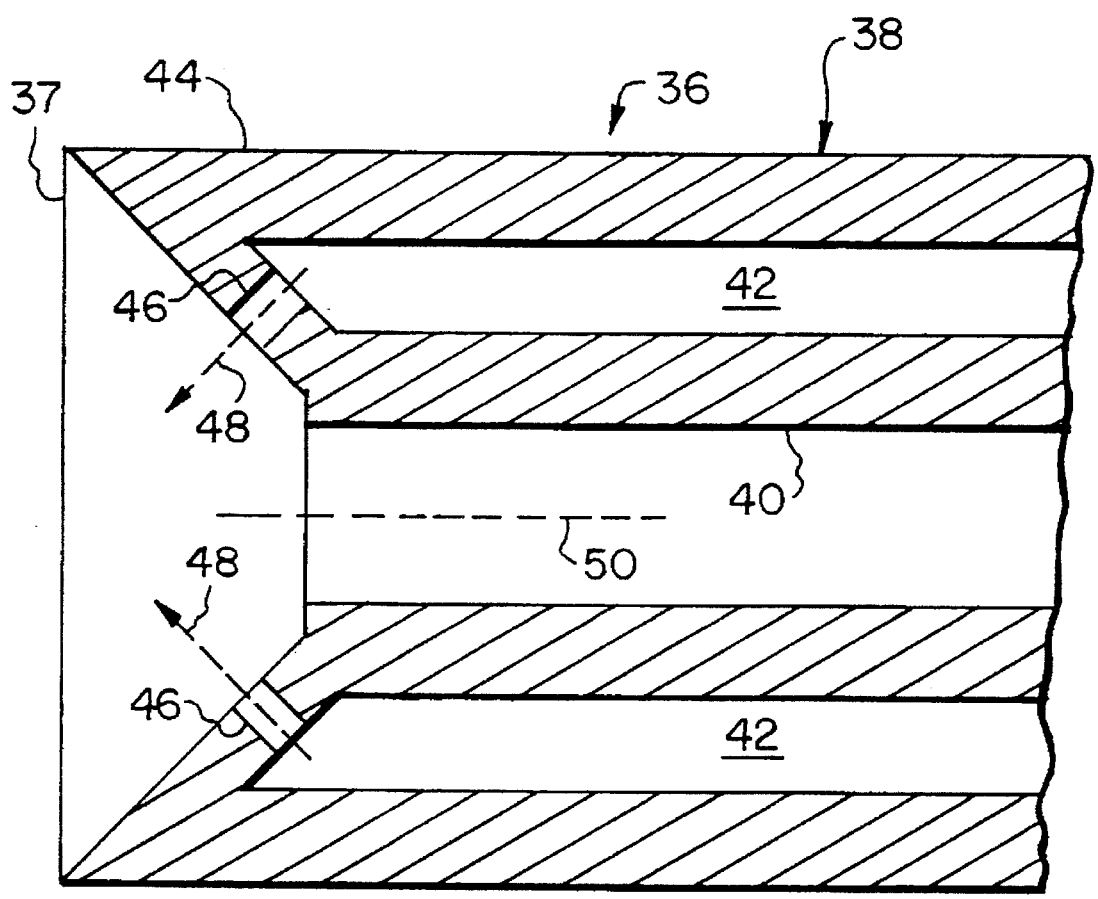
FIG. 5 is a schematic representation of a dual-fluid atomizer useful in the practice of the present invention.

Sulfuric acid is used as a catalyst in the alkylation of isoparaffins (isobutane) with olefins (isobutylene) to produce high octane gasoline. Spent sulfuric acid is generated as a byproduct in this process. Typically, spent sulfuric acid consists of 90% sulfuric acid, 4% water and 6% hydrocarbons. The spent acid is regenerated by first decomposing the acid into its constituents, then recovering the sulfur dioxide, which is subsequently oxidized to sulfur trioxide and then hydrated to form sulfuric acid. The following are simple equations which describe the total sulfuric acid regenerating process:

1) Dissociation

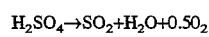

2) Oxidation

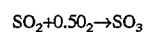

3) Hydration $$SO_3 + H_2O \rightarrow H_2SO_4$$

The dissociation (reaction 1 above) is endothermic and normally carried out in a furnace. A simple flow diagram of the dissociation step is shown in FIG. 1. Referring to FIG. 1 the spent acid represented by arrow 10 is injected into the furnace 12 through a nozzle or orifice 14 to create a spray of acid 16. Air represented by arrow 18 and a source of energy or fuel represented by arrow 20 are introduced into the furnace to provide the energy for dissociation. Arrow 20 can represent a separate supply of supplemental fuel which can be either natural gas or fuel oil in order to sustain combustion in furnace 12. Part of the energy for dissociation is provided by the combustion of the residual hydrocarbon in the spent acid. The temperature inside the furnace 12 is usually between 1800° and 2000° F. in order to promote the dissociation reaction as shown above. The off gases represented by arrow 22 usually contain 10% to 15% sulfur dioxide, along with oxygen, nitrogen, carbon dioxide and steam. The sulfur dioxide is separated from the off gas and processed in accord with the reactions as set forth above to a final regeneration of sulfuric acid which can be reused in the alkylation process.

The present invention concerns itself with the dissociation step represented by reaction 1 above, thus there need be no further discussion of the total spent sulfuric and recovery process.

Municipal or industrial waste water treatment facilities generate biosolids having a typical composition as set forth in Table 1 below:

TABLE 1

| Component | Weight % (dry basis) |
| --- | --- |
| Carbon | 45 |
| Hydrogen | 6 |
| Oxygen | 20 |
| Nitrogen | 4 |
| Sulfur | .1 to 1 |
| Chlorine | .4 to 1.5 |
| Ash | 25 |
| Total | 100 |

The biosolids are dewatered to a moisture content (wet basis) of 75% to 85% and have a heating value of approximately 8,000 (BTU/lb. dry). Physically, dewatered biosolids appear to be a semi-solid material even though it contains mostly water. The reason is that the water is bound up inside the cells of the biosolids material. Normally the biosolids exhibit an outer shell or encapsulation which is pliable (flexible) and exists as an agglomeration of coagulated cells.

This material would not be considered something that could normally be sprayed into the furnace without using a device such as shown in U.S. Pat. No. 5,405,537. This material is difficult to combust and almost impossible to pump. According to the present invention, dewatered biosolids containing 70% to 85% water with the remainder being organic and inorganic solids are introduced into an existing sulfuric acid furnace in order to destroy the biosolid waste material and at the same time utilize the heating value from combustion of the organic material in the dewatered biosolids. The process of the present invention utilizes a conventional spent acid dissociation furnace to combust biosolids without modification to the furnace. Therefore, there is no reduction in the capacity of spent acid dissociation in order to accommodate the introduction of the biosolids.

One method of increasing the capacity of a given spent acid dissociation furnace is by the introduction of oxygen enrichment in the combustion air as shown in FIG. 2. In addition to the air as shown by arrow 18 and the additional fuel shown by arrow 20 introduced into the furnace 12, oxygen shown by arrow 24 is introduced into the air 18 thus permitting more acid represented by arrow 10 to be processed in the existing furnace 12 thereby improving process economics to some extent. Combustion is normally carried out with air which contains approximately 21% oxygen, with the remainder being mainly nitrogen. Nitrogen does not play a useful role in combustion leading to heat losses and reaction with oxygen to produce nitrogen oxides ($NO_x$). The formation of thermal $NO_x$ is extremely temperature sensitive. Enriching the combustion air to approximately 28% oxygen increases the number of oxygen molecules available for combustion by about 33% without increasing the volume of combustion air or flue gas. Hence the processing capacity of the furnace 12 can be greatly increased. However, this technique has not been widely used commercially because oxygen enrichment leads to an increase in the furnace flame temperature including localized hot spots which have a detrimental effect on the furnace and oxygen constitutes an additional cost the acid reprocessor has to incur. Although the cost of oxygen is partially offset by the increased amount of acid processed, there is a total cost increase to the user.

According to the present invention, the benefits of oxygen enrichment can be utilized in dissociation of spent sulfuric acid by utilizing dewatered biosolid injection into the spent acid furnace to control the temperature and heat release rate inside the furnace. The biosolids help to maintain a constant furnace temperature by quenching the flame, therefore, production of thermal $NO_x$ will not increase using the process of the present invention. Dewatered biosolids have a net heating value close to zero. This means that the energy required to vaporize the water and the biosolids can be provided by the combustion of the organics in the biosolids. Consequently, there is no additional heat load on the furnace. However, there is a need to introduce additional oxygen molecules to combust the organics and the biosolids. This can be achieved by controlled enrichment of the combustion air with oxygen.

Because the dewatered biosolids have the water encapsulated in a solid shell, the dewatered biosolids must be conditioned by partial fracture of the solid shell simultaneously with or prior to introduction into the furnace.

One method of conditioning the biosolids to effect the process of the present invention is shown in FIG. 3. In FIG. 3, the furnace 12 injector 14, air 18, oxygen 24 and fuel supplies 20 are as previously described in relation to FIGS. 1 and 2. In addition, a pretreatment tank 30 is included so that spent acid represented by arrow 10 can be introduced into the pretreatment tank along with dewatered biosolids represented by arrow 32. Mixing of the spent acid and dewatered biosolids in pretreatment tank 30, produces a mixture where the acid causes the outer shell of the dewatered biosolid particles to begin to break down so that when the mixture of biosolids and spent acid represented by arrow 34 is introduced into the furnace 12 through the nozzle 14, the water contained in the dewatered biosolids is readily vaporized and the organic matter in the biosolid can be readily combusted in the presence of air enriched with oxygen. Not all of the spent acid is required to be mixed with the biosolids in pretreatment tank, therefore, spent acid can be directly injected into the furnace along with the mixture of spent acid and dewatered biosolids via a bypass conduit represented by arrow 11 in FIG. 3.

According to the present invention, FIG. 4 represents an alternate embodiment of the process of the present invention. Like numbers are used in FIG. 4 to represent steps or equipment described in conjunction with FIGS. 1 through 3. In the process of FIG. 4, the injector nozzle 14 of FIGS. 1, 2, 3 has been replaced with an injector nozzle 36 which is a dual fluid atomizer as shown in FIG. 5. The dual fluid atomizer 36 consists of a generally cylindrical housing 38 containing an inner generally cylindrical passage 40 through which the dewatered biosolids with or without being mixed with spent sulfuric acid can be introduced into the furnace 12. Surrounding the inner or central passage 40, is a second or annular passage 42 which terminates proximate a discharge end 37 of dual fluid atomizer 36. The discharge end 44 of passage 42 contains a plurality of generally cylindrical shaped passages or ports 46 which have longitudinal axes 48 which are disposed at an angle to the longitudinal axis 50 of passage 40. According to the present invention, dewatered biosolids can be introduced into the central passage 40 without being mixed with the spent sulfuric acid. An atomizing gas such as oxygen, methane, nitrogen, steam or the like is introduced into annular passage 42 and exits the ports 46 where it impinges on the dewatered biosolids causing the dewatered biosolids particles to further fracture, thus facilitating vaporization of the contained water in the biosolids and combustion of the organic matter in the biosolids. Spent sulfuric acid can be introduced into the furnace via a separate conduit, the conduit represented by arrow 11 as in FIG. 3. In FIG. 4, atomizing gas is represented by arrow 38. In the process of FIG. 4, if oxygen is used as the atomizing gas, additional oxygen may not be required to be introduced into the combustion air represented by arrow 18 in order to effect enrichment of the air contained in the furnace 12.

A series of calculations were made to illustrate four different furnace performance cases. The calculations were made using principles of chemical equilibrium. The estimates made by these calculations do not include the effect of chemical reaction kinetics or mass and heat transfer. However, the calculations summarized in Table 2 below are valuable in demonstrating the viability of the present invention.

TABLE 2

Theoretical Furnace Performance

|  | Case 1 Base | Case 2 O$_2$ | Case 3 Biosolids & O$_2$ | Case 4 Biosolids & O$_2$ |
|---|---|---|---|---|
| Biosolids/Acid, dry wt. basis | — | — | 1% | 5% |
| Sulfuric Acid, lb moles/hr | 100 | 110 | 110 | 110 |
| Air, lb moles/hr | 702.7 | 485.0 | 485.0 | 485.0 |
| Oxygen, lb moles/hr | 0 | 61 | 61 | 61 |
| Biosolids, lbs/hr | 0 | 0 | 666.7 | 3333.5 |
| Methane, lb moles/hr | 40 | 40 | 40 | 40 |
| Oxygen Concentration, % | 21 | 30 | 30 | 30 |
| Flame Temperature, F. | 1810 | 2002 | 1963 | 1839 |
| Flue Gas, lb moles/hr | 973 | 840 | 875 | 1011 |
| Flue Gas Composition (mole %) | | | | |
| Oxygen | 5.2 | 7.7 | 6.9 | 4.1 |
| Nitrogen | 56.9 | 45.5 | 43.7 | 38.0 |
| Steam | 22.2 | 27.3 | 30.1 | 39.9 |
| Carbon Dioxide | 7.8 | 9.4 | 9.5 | 9.6 |
| Sulfur Dioxide | 7.7 | 9.9 | 9.5 | 8.2 |
| Sulfur Trioxide | 0.3 | 0.2 | 0.2 | 0.2 |

TABLE 2-continued

Theoretical Furnace Performance

|  | Case 1 Base | Case 2 O$_2$ | Case 3 Biosolids & O$_2$ | Case 4 Biosolids & O$_2$ |
|---|---|---|---|---|
|  | 100.0 | 100.0 | 100.0 | 100.0 |

The data of Table 2 represents 4 cases which are based upon dissociation of spent sulfuric acid that has a composition of 90 wt. % sulfuric acid, 4 wt. % water and 6 wt. % hydrocarbon. For the purpose of the calculations decane ($C_{10}H_{22}$) was used as the hydrocarbon.

In Table 2, case 1 is the base case in which 100 lb. moles/hr of spent acid is dissociated by combustion with air using natural gas as a supplemental fuel. The calculated flame temperature is 1810° F. and the flue gas contains 7.7% SO$_2$.

In case No. 2, only the combustion air is enriched with oxygen to a level of 30% oxygen. There are no biosolids added to the furnace. Use of oxygen enrichment permits 10% more spent acid to be processed. The flame temperature increases from 1810° to 2002° F. and the concentration of SO$_2$ in the flue gas increases and the total flue gas flow rate decreases. In this case, the oxygen consumption is 2 tons of oxygen per ton of incrementally processed acid. The process demonstrated by Case 2, while appearing attractive, has two disadvantages. The first is that the flame temperature increases which can be a problem if the existing materials of construction cannot withstand higher temperature. The second problem is the cost of the oxygen required is not usually offset by the value of incremental spent acid regenerated.

Case 3 detailed in Table 2, utilizes biosolids containing 85% water and 15% solids. The use of the dewatered biosolids overcomes the disadvantages inherent in using oxygen enrichment of the air in accord with the process set forth as Case 2. The large amount of water in the biosolids helps to moderate the flame temperature. The biosolids are generally provided from a municipal or industrial water treatment plant and a charge for destruction of the biosolids by the sulfuric acid reprocessing facility can offset the cost of oxygen. As shown in Table 2, even a modest loading of biosolids (1% on a dry basis), results in a decrease of the flame temperature from 2002° F. to 1963° F. as compared to Case 2. The amount of acid processed is still 10% greater than that in Case 1 and the concentration of sulfur dioxide (SO$_2$) is higher.

In Case 4 set forth in Table 2, the biosolid loading is further increased to 5% of the spent acid on a dry basis. The increase in biosolid loading restores the flame temperature to 1839° F., permits 10% more spent acid to be processed and results in a higher concentration of SO$_2$ over the base case with only a marginal increase in flue gas flow rate. Oxygen consumption in Case 4 is 2 tons per ton of spent acid or 4 tons per ton of dry biosolids.

The foregoing analysis results in a conclusion that retrofitting in existing spent acid regeneration facility so that it can process biosolids is advantageous. Because oxygen increases the flame temperature and reduces the flue gas flow rate, the addition of biosolids because of their high moisture content, counter balances these 2 effects and thus promotes a synergistic effect by the simultaneous introduction of biosolids and additional oxygen into a furnace used to dissociate spent sulfuric acid.

The data set forth in Table 2 being based on chemical equilibrium, implies infinite time for the reactions to proceed to completion. However, in actual practice, the residence time in all furnaces is finite. Therefore, it is critical to disperse the biosolids into small particles so that complex chemical reactions and the mass transfer effects that constituted a combustion process can proceed to completion. Thus, it is necessary to precondition the biosolid particles by mixing with spent sulfuric acid and/or atomization prior to introduction into the dissociation furnace. The premixing of the biosolids with the spent sulfuric acid or the atomization begins the breakdown of the hard outer shell of the biosolids, thus facilitating vaporization of the contained water and combustion of the organic matter contained in the dewatered biosolids.

Spraying dewatered biosolids into a spent acid furnace was unknown prior to the present invention. Utilizing the spent sulfuric acid or atomizing gas such as oxygen to facilitate a breakdown of the cells containing the bound water to precondition the biosolids for introduction into the spent acid dissociation furnace was unknown prior to the present invention. Introduction of biosolids and oxygen in close physical proximity to one another, either by utilizing oxygen as an atomizing gas or enriching the air used for combustion in the furnace prevents the furnace flame temperature from increasing. Therefore, thermal $NO_x$ does not increase and the furnace refractory is not detrimentally affected. In addition, the oxygen molecules are provided exactly where they are needed, i.e., close to the heat, absorbing biosolids. There will be no local hot or cold spots in the furnace. Hot spots could lead to thermal $NO_x$ formation and equipment damage, while cold spots could cause carbon monoxide (CO) and dioxin formation.

As set forth above, the process will be economical because the operator of the spent acid reclamation facility will receive a fee for destruction of the biosolids. This should more than offset the cost of oxygen and result in a positive net income for the operation of a spent sulfuric acid recovery facility.

Having thus described our invention what is desired to be secured by Letters Patent of the United States is set forth in the appended claims.

What is claimed:

1. In a process for regenerating spent sulfuric acid by dissociation of the spent acid in a furnace into its constituents—sulfur dioxide, water and oxygen, followed by recovery of sulfur dioxide, oxidation of sulfur dioxide to sulfur trioxide and hydration of sulfur trioxide to form sulfuric acid a process for improving the dissociation step comprising:

conditioning dewatered biosolids from municipal or industrial wastewater treatment containing from about 70% to about 85% water by mixing together in a reaction zone the dewatered biosolids and at least a portion of the spent sulfuric acid for a period of time of from about 0.5 to about 5 hours thereby enhancing breakdown and combustion of said biosolids at the temperature of the furnace;

introducing the spent sulfuric acid and conditioned dewatered biosolids mixture, air enriched to contain greater than 21% oxygen, and a fuel into said furnace maintained at a temperature of from about 1800° to about 2000° F; and controlling the quantity of spent sulfuric acid, the quantity of conditioned biosolids, the quantity of fuel and the degree of oxygen enrichment of said air to effect complete dissociation of said spent sulfuric acid and incineration of said biosolids.

2. A process according to claim 1 wherein said biosolids and spent sulfuric acid are withdrawn from said reactor for injection into said furnace as a mixture.

3. A process according to claim 2 wherein said biosolids are further conditioned by injecting said mixture of biosolids and spent sulfuric acid into said furnace using a dual fluid atomization nozzle in which a second fluid is employed to impinge on the alewatered biosolid-containing mixture, thereby causing the alewatered biosolids particles further to fracture.

4. A process according to claim 3 wherein said second fluid is selected from the group consisting of air, oxygen, nitrogen, carbon dioxide, methane, steam and mixtures thereof.

5. A process according to claim 1 wherein said fuel is fuel oil.

6. A process according to claim 1 wherein said air is enriched to contain between greater than about 21% and about 30% oxygen.

7. A process according to claim 2 wherein said mixing is effected in a pre-treatment tank and the mixture is held therein before being injected into said furnace.

8. A process according to claim 1 wherein spent sulfuric acid is introduced into said furnace at a rate of from 25 to 100 lbs. of spent acid per pound of biosolids, both on a dry basis.

9. A process according to claim 1 wherein said air and oxygen are injected into said furnace as separate streams.

* * * * *

UNITED STATES PATENT AND TRADEMARK OFFICE
CERTIFICATE OF CORRECTION

PATENT NO.   : 5,628,976
DATED        : May 13, 1997
INVENTOR(S)  : Shahani, et al.

It is certified that error appears in the above-indentified patent and that said Letters Patent is hereby corrected as shown below:

<u>In the Claims</u>:

Column 8, line 26, delete "alewatered" and insert in its place -- dewatered --.

Column 8, line 27, delete "alewatered" and insert in its place -- dewatered --.

Signed and Sealed this

Nineteenth Day of August, 1997

Attest:

BRUCE LEHMAN

Attesting Officer   Commissioner of Patents and Trademarks